United States Patent
Vincent et al.

(10) Patent No.: US 12,436,870 B2
(45) Date of Patent: Oct. 7, 2025

(54) METHOD AND APPARATUS FOR DETECTING OUTLIERS IN A SET OF RUNS OF SOFTWARE APPLICATIONS

(71) Applicant: BULL SAS, Les Clayes Sous Bois (FR)

(72) Inventors: Lionel Vincent, Brie-et-Angonnes (FR); Trong-Ton Pham, Grenoble (FR); Salim Mimouni, Grenoble (FR)

(73) Assignees: BULL SAS, Les Clayes Sous Bois (FR); COMMISARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 177 days.

(21) Appl. No.: 17/988,937

(22) Filed: Nov. 17, 2022

(65) Prior Publication Data
US 2023/0161683 A1 May 25, 2023

(30) Foreign Application Priority Data
Nov. 25, 2021 (EP) ..................................... 21306637

(51) Int. Cl.
*G06F 9/44* (2018.01)
*G06F 11/3604* (2025.01)

(52) U.S. Cl.
CPC ................................ *G06F 11/3616* (2013.01)

(58) Field of Classification Search
CPC .................................................... G06F 11/3616
See application file for complete search history.

(56) References Cited

U.S. PATENT DOCUMENTS

| 10,614,132 B2 * | 4/2020 | Bingham | G06F 16/90335 |
| 2006/0020924 A1 * | 1/2006 | Lo | G06F 11/3447 717/124 |
| 2013/0110761 A1 * | 5/2013 | Viswanathan | G06F 16/24578 706/52 |
| 2017/0019308 A1 * | 1/2017 | Rapoport | G06F 11/3452 |
| 2019/0102276 A1 * | 4/2019 | Dang | G06F 11/3452 |

(Continued)

FOREIGN PATENT DOCUMENTS

FR 3082962 A1 12/2019

OTHER PUBLICATIONS

European Search Report for corresponding EP Application No. 21306637.6, dated May 13, 2022.

(Continued)

*Primary Examiner* — Qamrun Nahar
(74) *Attorney, Agent, or Firm* — MEAGHER EMANUEL LAKS GOLDBERG & LIAO, LLP

(57) ABSTRACT

A method for detecting outlier behavior in a set of executions of one or several applications on an information processing device, implemented by a computer and comprising steps of
triggering (S1) said set of executions in collaboration with a profiling tool in order to collect, for each execution, at least one time series of measurement points assigning, for each measurement point, a value to a measured parameter;
automatically formatting (S2) the time series obtained for said set, by adjusting, for each time series, its length, its values, and its number of measurement points;
calculating (S3) a metric between two time series among the time series collected for said set of executions;
detecting (S4) an outlier based on said distance.

8 Claims, 1 Drawing Sheet

(56) References Cited

U.S. PATENT DOCUMENTS

2019/0392331 A1* 12/2019 Vincent .............. G06F 11/3452
2020/0322703 A1* 10/2020 Bures ..................... G06F 16/27
2021/0349897 A1* 11/2021 Pierri ................. G06F 11/3447

OTHER PUBLICATIONS

Frein, "State Acquisition in Computer Networks", 2018 IFIP Networking Conference (IFIP Networking) and Workshops, IFIP, pp. 1-9, XP033540884, May 14, 2018.
Liu, N. et al., "On the role of burst buffers in leadership-class storage systems" (2012), IEEE 28th Symposium on Mass Storage Systems and Technology (MSST).
Mesnier, M. et al., "Object-based storage", IEEE Communications Magazine (2003), 84-90, 41(8).
Breitenfeld, M. et al. "DAOS for Extreme-Scale Systems in Scientific Applications", in arXiv preprint arXiv:1712.00423, 2017.

* cited by examiner

METHOD AND APPARATUS FOR DETECTING OUTLIERS IN A SET OF RUNS OF SOFTWARE APPLICATIONS

FIELD OF THE INVENTION

The present invention relates to profiling software applications running on an information processing device, in particular to detect outlier behavior among the executions.

It applies in particular to the field of high-performance computing on supercomputers.

BACKGROUND OF THE INVENTION

Some software applications involve extremely large amounts of processing, due to the volume of data to be processed and/or the complexity of the processing to be performed on that data.

Examples include weather forecasting applications, digital image processing applications, such as medical imaging, physical simulation applications (strength of materials calculations, aerodynamic calculations, etc.), neural network learning, chemical object modeling applications (structure and property calculations, molecular modeling, etc.), financial or insurance simulation applications, cryptanalysis applications, etc.

In some cases, applications are also subject to real-time or near-real-time constraints.

The challenge is therefore to reduce and control the computing time for these applications. To do this, they can be run on powerful information processing devices, such as supercomputers. Users can choose to run their application on a processing device, usually remote, through a telecommunication network.

A supercomputer is a computer designed to achieve the highest possible performance with the techniques known at the time of its design, particularly related to the computing speed. The science of supercomputers is called "high-performance computing" (HPC).

However, information processing devices, especially supercomputers, are complex systems, and the interactions between software applications and them are further complicated by the multiple configuration parameters of the applications and the processing device, as well as by the competition between different applications running simultaneously on the same processing device.

Also, users are often faced with a lower efficiency of their applications than they expected.

Application execution analysis tools have been proposed to try to understand possible problems, especially bottlenecks that penalize the execution time of all or some of the applications.

Profiling tools are used to collect measurements of certain parameters while an application is running.

For example, code profiling makes it possible to obtain measurements, during the execution of an application, including the list of called functions and the time spent in each of them, the use of the processor(s), the use of the memory, etc. Code profiling can typically be implemented by instrumenting the source code by adding instructions.

Input/output profiling tools have also been proposed, such as the "Bull IO Instrumentation" tool. This tool is part of a suite containing other downstream tools that analyze the measurements collected by the profiling tool.

However, these tools are largely directed at profiling the execution of applications.

The inventors believe that it would also be interesting to profile the applications themselves, in order to deduce conclusions about their behavior and thus make it possible to refine execution parameters for the application.

SUMMARY OF THE INVENTION

An objective of the present invention is to provide a solution that at least partially addresses this shortcoming of the state of the art. In particular, the invention aims at detecting outlier behaviors among different executions of the same application.

According to some embodiments of the invention, once the outlier executions have been detected, it is possible to determine an invariant behavior for the application (corresponding to its normal operation) and to possibly trigger optimization actions in a more relevant way on the basis of this normal behavior characteristic of the application (and not of an execution).

To this end, according to a first aspect, the present invention may be implemented by a method of detecting outlier behavior in a set of executions of one or several applications on an information processing device, implemented by a computer and comprising steps of:

triggering said set of executions in collaboration with a profiling tool in order to collect, for each execution, at least one time series of measurement points assigning, for each measurement point, a value to a measured parameter;

automatically formatting the time series obtained for said set, by adjusting, for each time series, its length, its values, and its number of measurement points;

calculating a metric between two time series among the time series collected for said set of executions;

detecting an outlier based on said distance.

According to preferred embodiments, the invention comprises one or several of the following features which may be used separately or in partial combination with each other or in total combination with each other:

the formatting is done by pairs of time series within said set;

an outlier is detected when said distance is greater than a threshold;

the method comprises providing information corresponding to said outlier to a user via a human-machine interface;

the method comprises automatically determining runtime optimization parameters for an application, from the executions of the same application, excluding the executions for which an outlier was detected;

the method comprises a step of selecting an acceleration module for an application, from the executions of the same application, excluding the executions for which an outlier was detected;

said length normalization comprises projecting each measurement point of said time series toward a reference interval;

said normalization of its values comprises dividing each value of said numerical series by a total quantity corresponding to the set of values for said time series;

said total quantity is an approximation of the integral of said time series with respect to time;

said normalization of the number of measurement points comprises interpolating a set of additional measurement points so that the number of measurement points of said time series is equal to the number of measurement points of a longer time series of said set;

said distance is calculated based on the cumulative sums of the values of said time series According to another aspect, the invention may also be implemented by a computer program, such as a program performed by a computer (such as one having one or more processors operably coupled to a memory and a non-transitory computer-readable storage medium), the non-transitory computer-readable storage medium comprising instructions which, when the program is executed by a computer, cause said computer to perform the method as previously described.

According to another aspect, the invention can also be implemented by a device for detecting outlier behavior in a set of executions of one or several applications on an information processing device, comprising means for:

triggering said set of executions in collaboration with a profiling tool in order to collect, for each execution, at least one time series of measurement points assigning, for each measurement point, a value to a measured parameter;

automatically formatting the time series obtained for said set, by normalizing, for each time series, its length, its values, and its number of measurement points;

calculating a distance between two time series among the time series collected for said set of executions;

detecting an outlier based on said distance.

According to preferred embodiments, the invention comprises one or several of the following features which may be used separately or in partial combination with each other or in total combination with each other:

the device comprises means for furthermore providing information corresponding to said outlier to a user via a human-machine interface;

the device comprises means for furthermore automatically determining runtime optimization parameters for an application, from the executions of the same application, excluding the executions for which an outlier was detected.

Further features and advantages of the invention will become apparent from the following description of a preferred embodiment of the invention, given by way of example and with reference to the attached drawings

DETAILED DESCRIPTION OF EMBODIMENTS OF THE INVENTION

Figure 1:
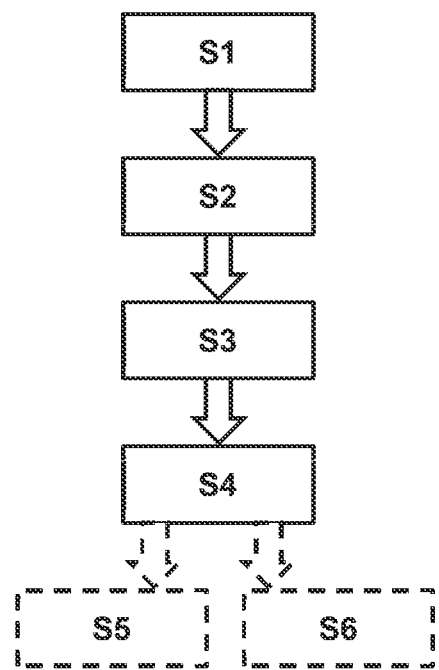
FIG. 1 schematically represents an example flowchart according to one embodiment of the invention.

FIG. 1 shows a flowchart according to one embodiment of the invention. This flowchart is illustrative and is intended primarily to better explain the invention.

In a step S1, application executions are triggered in collaboration with a profiling tool. One or several distinct applications can be the subject of one or several executions each.

We can call these executions of an application "jobs". In computer science, the term "job" can be considered a unit of work or of the execution of that work. A job thus associates the identification of an application and the identification of the contextual elements of its application: the underlying hardware context (the execution resources: nodes of the supercomputer, etc.) and the data to be processed.

Different profiling tools can be used to collect, for each execution of an application, at least one time series of measurement points.

An example of a tool is the "Bull IO Instrumentation" input/output profiler. This tool is described on the Atos web page: www.atos.net.

Bull IO Instrumentation is an intuitive profiling tool that helps system administrators, developers and product support experts analyze the I/O activity generated by HPC tasks. Role-based access control is included to provide different levels of information to various predefined user groups: system administrators, operators, or regular users. This tool collects, stores and displays a set of metrics related to inputs and outputs through a very ergonomic graphic interface.

Other profiling tools are also available. The invention is in fact independent of the profiling tool used, as long as that tool can generate time series of parameter values representative of the behavior of application executions.

Examples include the tool BEO, "Bull Energy Optimizer", or the tool BDPO, "Bull Dynamic Power Optimization", which specialize in profiling the energy consumption of all the components of the information processing platform (CPU, file system, etc.) in order to optimize it.

There are other proprietary tools also such as LLView, offered by the Julich Supercomputer Center, and open source tools such as Prometheus.

Each measurement point assigns a value to the parameter, or metric, being measured.

The measurement points are usually spaced by an interval that can be constant and fixed beforehand. The value of the measuring point is then representative of this time interval. This time interval can be sized according to a compromise that makes it possible to closely track the evolution of the measured parameter over time while also not overloading the system by storing too many measurements. A classic example of a time interval is 5 seconds.

Many types of parameters thus can be monitored and measured.

These parameters can relate to different aspects of the behavior of executions, or jobs.

In particular, these parameters can relate to the inputs and outputs of application jobs. Indeed, it is noted that HPC (High-Performance Computing) applications devote a significant part of their execution time to performing I/O (inputs/outputs). The volumes of data that are processed represent in themselves an important cause of the performance problems of application executions: as the networks used to exchange the data have finite bandwidth, the reading and writing times cannot be lower than a theoretical minimum. Other factors may also have a significant impact. For example, concurrent execution of two applications or of the same application can result in access conflicts to common storage resources that impact performance. The way a given application performs its I/O can also impact performance in a very important way in case it saturates storage devices by requiring the processing of a very large number of small operations.

The measurement of parameters representative of the I/O of application executions therefore provides a good indicator of application performance.

Again, different I/O parameters can be used, and the invention is independent of the type of parameters. These depend mainly on the profiling tool and the type of applications and information processing device. Non-limiting examples include read I/O volume, write I/O volume, read I/O time, write I/O time, etc.

For a given measured parameter, the succession of values captured over time forms a time series.

In general, several measurements are taken simultaneously, on just as many parameters.

Thus as stated in the Wikipedia page, "a time series is a sequence of numerical values representing the evolution of a specific quantity over time" (source: fr.wikipedia.org/wiki/Série_temporelle).

When several application executions take place at the same time, we can collect a set of time series, each associated with a given application execution.

The challenge is to determine, from these time series, the behavior of these applications in order to better understand the underlying problems and to improve the conditions of their subsequent execution to optimize performance.

However, it turns out in practice that each execution of the same application can be the subject of a separate execution context.

Indeed, at least two situations can arise that influence its own behavior, and thus the respective time series.

First of all, depending on the moments at which the execution of an application is triggered, the available resources of the information processing device may differ. For example, in the case where the information processing device is a supercomputer shared between several clients, its load varies depending on the clients' queries.

Therefore, a first execution of an application could be triggered on a first set of resources (for example 10 nodes of the supercomputer), while a second execution of the same application could be triggered on a second set of resources (for example 2 nodes of the supercomputer).

On the other hand, two executions of the same application can be triggered on a different volume of data. For example, an application that takes digital images as input can be run with images of very different resolutions. As a result, the time series for the I/O parameter measurements will have substantially different values.

For at least these reasons, the proposals in the state of the art do not allow us to determine, from the time series of each execution, a nominal behavior for the application, which would be invariant (or vary little) with respect to the contexts of each execution.

It follows that these state-of-the-art proposals can neither detect outlier behavior of a particular execution nor trigger actions based on such nominal behavior.

Figure 2:
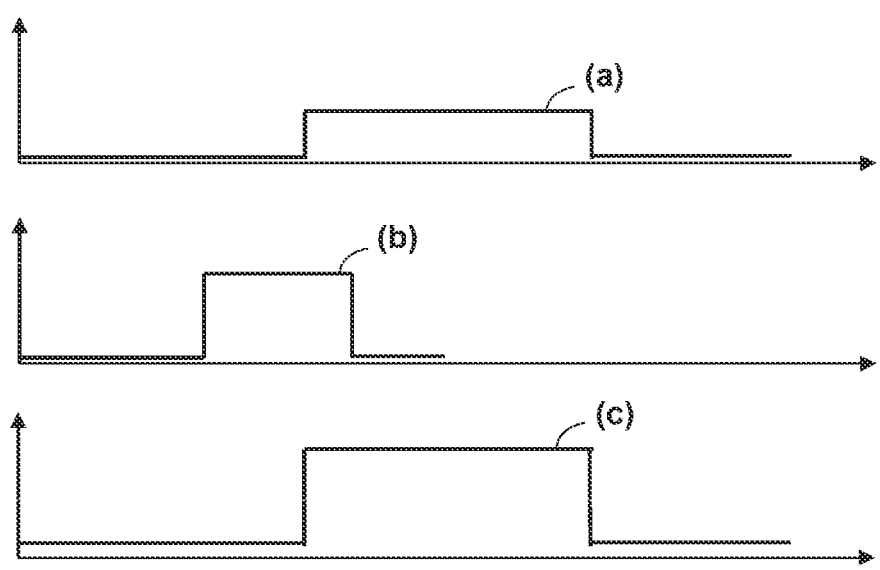
FIG. 2 shows example activities of 3 executions of the same application, according to one embodiment of the invention

FIG. 2 shows this situation and provides a better understanding of the influence of the execution context.

Each of the three curves represents a time series relating to the same I/O parameter for 3 different executions of the same application.

In this example, all three curves show the same general behavior:
- a first phase during which the measured parameter has a low value (the application is busy performing Internet processing and little or no I/O).
- a second phase, during which the measured parameter has a high value (the application is performing I/O)
- a third phase during which the measured parameter has a low value (the application is busy performing Internet processing and little or no I/O).

Curve (a) represents a baseline execution: the application performs 20 minutes of internal processing, then I/O for 20 minutes with a volume of 10 GB, then another 20 minutes of internal processing.

Curve (b) represents an execution on doubled resources (twice as many supercomputer nodes): the application performs 10 minutes of internal processing, then 10 minutes of I/O with 10 GB of volume, then 10 minutes of internal processing again.

Curve (c) represents an execution on identical resources as curve (a) but with duplicate data: the application performs 20 minutes of internal processing, then I/O for 20 minutes with a volume of 20 GB, then again 20 minutes of internal processing.

State-of-the-art methods for comparing executions based on time series of measured execution parameters involve computing distances between these time series.

However, measuring the distance between any pair of time series (a), (b), (c), we do not obtain a zero value, nor even a constant value. Additionally, measuring such a distance does not easily make it possible to determine potential outlier behavior between different executions of the same application.

For example, the DTW algorithm, for "Dynamic Time Warping", is an algorithm that measures the similarity between two sequences that can vary over time. It has been used in video, audio, computer graphics, bioinformatics, etc. and can be applied in any situation where data can be transformed into a linear representation. A famous application is in automatic speech recognition, where it is necessary to take into account very variable talking speeds.

In general, DTW is a method that searches for an optimal match between two time series, with certain restrictions. The time series are distorted by non-linear transformation of the time variable, to determine a measurement of their similarity, independent of some non-linear transformations of time.

This algorithm can be used to compute a distance between two time series that takes into account a time scale or a phase shift.

However, the DTW algorithm is very sensitive to differences in values between time series. Thus, in the example of FIG. 2, the values are very different between curves (a) and (b), as well as between curves (a) and (c), so that the respective distances between (a) and (b) and between (a) and (c), according to the DTW algorithm, will be large.

In other words, the DTW algorithm does not do anything to minimize a distance between time series belonging to executions of the same application. Thus, it appears that the DTW algorithm would not allow for the determination of outlier behavior of an execution, and thus would not allow for the determination of a consistent set of executions to determine a nominal, or invariant, behavior specific to the application itself.

On the other hand, the DTW algorithm is a complex algorithm that requires the construction of a matrix N1×N2, where N1 and N2 are the numbers of measurement points in the two time series whose distance is calculated. Also, the computation of a distance according to the DTW algorithm generates a computational complexity in $o(N^2)$, as well as a memory footprint, also in $o(N^2)$.

One aspect of the invention consists of determining a way to calculate the distance between two time series that is truly representative of the application's behavior over time and not very sensitive to fluctuations in values or duration caused by the availability of computing resources or by the volume of data to be processed.

To do this, a step S2 is proposed to format the time series obtained for the set of executions, by adjusting, for each time series, its length, its values and its number of measurement points. This adjustment consists of modifying the length and/or the values and/or the number of points of one or several time series in order to make them match the length and/or the values and/or the number of points of a given time series (called the "reference" time series).

In a preferred embodiment, the formatting is performed in pairs of time series within this set.

Alternatively, it is possible to proceed at once on all the executions. However, such a way of doing is less efficient because it is more expensive in terms of execution time).

A first adjustment relates to the length of the time series.

Indeed, each time series can have a variable number of measurement points: this variability can be inherent to the type of parameter measured, but also to the settings of the profiling tool. For example, it can be possible to specify different intervals between measurement points depending on the parameters being measured.

The time series can therefore have variable lengths, and in order to be able to compare them better, they can be normalized on a reference interval. This reference interval can be the interval of one of the time series (for example the shortest one), or a "neutral" interval, for example [0; 1].

Any time series of length n ('n' being the number of measurement points) can thus be adjusted by projecting each measurement point of this series to a reference interval.

If we take the example of a reference interval [0;1] and if we assume that the measurement points are equidistant in time (that is obey a periodic measurement of a parameter), we can write that the adjusted time series is the set:

$$\{t_j\}_{j=1}^n, \text{ where } t_j = \frac{j-1}{n-1}$$

where n is the number of measurement points, and $t_j$ the measurement point j, where $j \in [1; n]$ and j is an integer.

A second adjustment relates to the values of the time series.

This adjustment can be seen as a normalization of the values of the time series.

There are several ways to do this. For example, it is possible to normalize the values by projecting them onto a reference interval, assigning the high and low values of this interval to the maximum and minimum values, respectively, of the compared time series.

According to one embodiment, the values of each time series are normalized by a total quantity corresponding to the set of values for that time series. According to one embodiment, this quantity is an approximation of the integral of the time series with respect to time.

This quantity can be calculated as the sum of all these values. This quantity thus calculated forms an approximation of the integral of the time series (that is, graphically, the area under the curve providing the values for each measurement point).

If the time series to be compared do not share the same sampling rate (period between two measurement points), more accurate methods can be used to estimate the integral of the time series. Examples include Simson's method or the trapezoidal method.

Many other methods exist to approximate an integral. The Wikipedia page on the numerical calculation of an integral lists a number of them: fr.wikipedia.org/wiki/Calcul_numérique_d'une_intégrale.

In the case of a multivalued time series, that is associating several values with the same measurement point, each value must be taken separately to be normalized with the associated integral quantity.

A third adjustment relates to the number of points in the time series.

Even if the time series have been adjusted in length, they may still have a number of different measurement points. In order to be able to compare two time series, and to calculate a metric between them, like a distance, one adjusts the number of points.

This is done by interpolating a set of additional measurement points so that the number of measurement points in the time series is equal to the number of measurement points in a longer time series of the set of executions of the application under consideration.

In other words, if we consider two time series, the shorter time series is interpolated to obtain a number of measurement points equal to that of the longer time series, by adding additional "artificial" (that is calculated and not measured) measurement points.

These additional measurement points should not add information or change the semantic content of the time series. Also, these additional measurement points should be located on the time series curve.

According to one embodiment, the measurement points of the time series to be adjusted are replaced by these additional measurement points which have the x-axis of the longest time series. In this way, the x-axes of all time series are identical.

Different interpolation techniques exist and can be used for this adjustment step.

In particular, the value to be assigned to an interpolated measurement point can be determined by a function that can locally approximate the time series curve.

For example, if the curve has a sinusoidal behavior, one can use a spline or a polynomial approximation to locally approximate the curve and determine the value of the additional point.

If the values vary little over an interval around the additional point, linear interpolation may be sufficient to determine the value of the additional point.

After this formatting step S2, a similarity between two time series can be measured independently of the linear transformations on the x (time) and y (value) scales of each of them.

In other words, time series normalized in this way are no longer sensitive to the influence of different data volumes for different executions of the same application, or of different computing resources.

In a step S3, a metric is calculated between two time series among the time series collected for the set of executions. This metric aims at quantifying a dissimilarity between time series and can notably take the form of a distance between time series.

Due to the adjustments made previously, the metric is normally minimal for executions corresponding to the same application.

Therefore, this metric calculation can make it possible, in a step S4, to detect an outlier within the set of executions.

Indeed, if a time series of an execution has a metric (or distance, for example) that is too large with the time series of the other executions of the same application, then we can estimate that this execution has an outlier behavior.

As a reminder, in statistics, an outlier is a value or an observation that is "distant" from other observations made on the same phenomenon, that is it contrasts greatly with the "normally" measured values.

This outlier may correspond to a malfunction of the application during this execution, or to a malfunction of the execution context or of the profiling tool. In any case, the time series corresponding to this execution must be considered as not representative of the application.

Also, the detection of an outlier enables at least two actions:
- alert the user to this outlier
- exclude the corresponding execution when determining a nominal behavior for the application.

Different distances can be used, in step S4, to allow the detection of an outlier execution based on the time series. As non-exhaustive examples, well known to the skilled artisan, we can mention:
- the Euclidean distance, or L2,
- the distance L1,
- the Minkowski distance,
- the Manhattan distance,
- the Cosine distance,
- the Chebyshev distance, etc.

According to one embodiment of the invention, the distance is calculated on the cumulative sums of the values of the time series.

This calculation can be written by the following expression $$d(t1; t2) = d\left(\left\{\sum_{i=1}^{j} t1_i\right\}_j, \left\{\sum_{i=1}^{j} t2_i\right\}_j\right)$$

wherein:
- $d(t1; t2)$ is the distance between the two time series t1 and t2;
- $t1_i$ and $t2_i$ represent the $i^{th}$ value of, respectively, the time series t1 and the time series t2;
- $\sum_{i=1}^{j} t1_i$ and $\sum_{i=1}^{j} t2_i$ thus form the cumulative sums at rank j of the values of time series t1 and t2, respectively,
- the distance d(t1;t2) is then expressed as a distance 'd' between the two sets of values (expressed by the curly braces) formed by these cumulative sums.

On the basis of these cumulative sums, it is possible to apply a distance function d, in order to obtain a distance value between two time series.

For example, it is possible to evaluate the average of the absolute values of the differences between the values of time series of the same rank j in the two series. In other words:

$$d(t1; t2) = \frac{1}{N}\sum_{j=1}^{N}\left\|\sum_{i=1}^{j} t1_i - \sum_{i=1}^{j} t2_i\right\|$$

In some cases, the time series are multivariate, that is they associate a plurality of values with the same measurement point. In other words, we can associate the same execution of an application, with a time series grouping several measurements of parameters.

The procedure described below remains valid in this case.

In step S3, the calculation of a metric between two time series can be performed by calculating the metrics (as previously described) for each component of the time series, and then calculating an overall metric combining these different distances.

Thus, if the time series t1, t2 associate each measurement point with X values $t_{11}, t_{12} \ldots t_{1x}$, respectively $t_{21}, t_{22} \ldots t_{2x}$, it is possible to calculate x distances $d_k$ of components by:

$$d_k(t1; t2) = d\left(\left\{\sum_{i=1}^{j} t1_{ki}\right\}_j, \left\{\sum_{i=1}^{j} t2_{ki}\right\}_j\right)$$

We can then compute a global distance from these x distance $d_k(t1; t2)$ in different ways, for example by a Minkowski distance.

In particular, one can combine the component distances as orthogonal coordinates, so that the global distance d(t1; d2) can be expressed:

$$d(t1; t2) = \sqrt{\sum_{k=1}^{x}(d_k(t1; t2))^2}$$

From this distance, we can detect an outlier within the collected time series, and thus application executions with outlier behaviors.

For example, we can compute distances between several (possibly all) pairs of time series obtained for different executions of the same application.

If a distance is greater than a threshold, then one of the two time series involved can be considered an outlier. By cross-checking several calculated distances, we can discriminate which one is actually an outlier. If a distance is greater than a threshold and if it has already been established that one of the two time series has distances less than the threshold compared to other series, then it can be directly deduced that the other series is an outlier.

The threshold can be predefined but can also be self-adapting according to the different distance values obtained.

In a step S5, execution information corresponding to the outlier time series can be provided to a user via a human-machine interface. For example, this information can contain data identifying this execution and its execution context (name of the application, execution date, execution parameters set by the user, volume of data processed, etc.). The user can then investigate the cause of this outlier execution, in order to possibly disregard the results of that execution and/or remedy the underlying problems.

Furthermore, in a step S6, runtime optimization parameters for the application can be automatically determined from the executions of the same application by excluding the executions for which an outlier has been detected.

Indeed, once the outlier time series are discarded, the remaining time series make it possible to describe the normal behavior of the application. Based on normal behavior, we can automatically determine how to optimize subsequent executions of the application.

Also, it is possible to provide a step of selecting an acceleration module for an application, from the executions of the same application, excluding the executions for which an outlier was detected.

As previously explained, once the outlier time series are discarded, the remaining time series make it possible to describe the normal behavior of the application. Based on normal behavior, it is possible to automatically select an acceleration module from a catalog of available modules. Each of the available modules may have particular application conditions and the selection aims to determine which modules have the application conditions that best match the normal behavior of the application.

For example, the "Small Read Optimizer" (SRO) acceleration module from Atos is described on the company's website or in articles such as Robert, Sophie & Zertal, Soraya & Goret, Gael, "*Auto-tuning of IO accelerators using black-box optimization*", 1022-1027. 10.1109/HPCS48598.2019.9188173 (2019).

This module seeks to optimize the reading and writing of small volumes (typically less than 4 kilobytes) but multiple and concentrated in time, by recovering in advance frequently accessed blocks to put them in buffer memory.

Another available module may be the "Smart Burst Buffer" (SBB) module, also from Atos.

The choice between these two modules (and others) can be based on an analysis of the application's I/O behavior. This analysis can be performed using time series from a profiling tool.

The invention makes it possible to exclude from these time series the outliers whose presence could have disturbed the analysis and caused the selection of a non-optimal acceleration module.

In addition, it can be provided to determine parameters of the selected acceleration module. As an example, the SRO module has 4 parameters and the SBB module has a dozen.

Other parameters that can have a significant impact on the execution of an application can also be automatically determined, such as the parameters of a parallelization tool (those of the MPI, "Message Passing Interface", for example), or internal parameters of the application itself.

According to one embodiment, this automatic optimization step can be performed iteratively.

Thus, the same application can be executed several times, changing its execution parameters. By means of the method of the invention, one can discard the outliers, and consider the normal behavior of the application and evaluate different performances related to the use of a different set of parameters.

At each iteration, the parameters can be changed deductively, that is taking into account the parameters already executed. Different strategies are then possible to browse the space of possible parameter values in order to obtain an optimal parameter set.

According to one embodiment, the described method may be implemented by an outlier detection device. This device can be a software module implemented on a computer, that is any information processing platform. In particular, this platform can be implemented by a set of circuits co-located in a centralized server or distributed within a distributed server or among a set of servers. This set of servers may comprise "server farms" or "cloud computing" arrangements.

This computer can be the same as the information processing platform on which the supervised applications are executed, or another platform to which it is connected via communication means in order to collect the time series.

Of course, the present invention is not limited to the examples and embodiment described and shown, but is defined by the claims. In particular, it is susceptible to numerous variants accessible to the skilled artisan.

What is claimed is:

1. A method for detecting outlier behavior in a set of executions of one or several applications on an information processing device, implemented by a computer, the method comprising:
    triggering said set of executions in collaboration with a profiling tool in order to collect, for each execution, at least one time series of measurement points assigning, for each measurement point, a value to a measured parameter;
    automatically formatting the time series obtained for said set, by adjusting by normalization, for each time series, its length, its values, and its number of measurement points;
    said adjusting of its length comprising projecting each measurement point of said time series toward a reference interval, said adjusting of its values comprising dividing each value of said numerical series by a total quantity corresponding to all values for said time series, and said adjusting of its number of measurement points comprises interpolating a set of additional measurement points so that the number of measurement points of said time series is equal to the number of measurement points of a longer time series of said set;
    calculating a metric between two time series among the time series collected for said set of executions;
    detecting an outlier based on a comparison of said metric with a threshold, said outlier being detected when said metric is greater than said threshold;
    excluding, for one of said applications, executions of said set for which an outlier has been detected; and
    determining a normal behavior of said application from the remaining executions.

2. The method according to claim 1, wherein formatting is performed in pairs of time series within said set.

3. The method according to claim 1, further comprising providing information corresponding to said outlier to a user via a human-machine interface.

4. The method according to claim 1, further comprising automatically determining runtime optimization parameters for an application, from the remaining executions of said application, said automatically determining comprising repeating executions of said applications with different sets of executing parameters and evaluating performances of said application for said set of executing parameters by considering the normal behavior of said application.

5. The method according to claim 1, further comprising selecting an acceleration module for an application, from the executions of the same application, excluding the executions for which an outlier was detected.

6. The method according to claim 1, wherein said total quantity is an approximation of the integral of said time series with respect to time.

7. The method according to claim 1, wherein said metric is calculated on the cumulative sums of the values of said time series.

8. A non-transitory computer-readable storage medium comprising instructions which, when executed by a computer, cause said computer to perform the method according to claim 1.

* * * * *